United States Patent
Chidester et al.

(10) Patent No.: US 9,804,980 B2
(45) Date of Patent: Oct. 31, 2017

(54) SYSTEM MANAGEMENT THROUGH DIRECT COMMUNICATION BETWEEN SYSTEM MANAGEMENT CONTROLLERS

(71) Applicant: Dell Products, LP, Round Rock, TX (US)

(72) Inventors: Philip D. Chidester, Austin, TX (US); John R. Sieber, Cedar Park, TX (US); Munir U. Ahmad, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 541 days.

(21) Appl. No.: 13/950,996

(22) Filed: Jul. 25, 2013

(65) Prior Publication Data
US 2015/0032925 A1    Jan. 29, 2015

(51) Int. Cl.
*G06F 13/00*    (2006.01)
*G06F 13/36*    (2006.01)
*G06F 13/42*    (2006.01)

(52) U.S. Cl.
CPC .......... *G06F 13/36* (2013.01); *G06F 13/4273* (2013.01); *G06F 13/4291* (2013.01)

(58) Field of Classification Search
CPC .. G06F 13/36; G06F 13/00; G05B 2219/1215
USPC ................... 710/110, 305–306, 100
See application file for complete search history.

(56) References Cited

U.S. PATENT DOCUMENTS

| | | | |
|---|---|---|---|
| 6,070,214 A * | 5/2000 | Ahern | G06F 13/4045 |
| | | | 710/106 |
| 7,710,075 B1 | 5/2010 | Kilbourne, II et al. | |
| 7,840,840 B2 | 11/2010 | Takahashi et al. | |
| 8,129,946 B2 | 3/2012 | Wang et al. | |
| 8,129,947 B2 | 3/2012 | Chiasson et al. | |
| 8,179,094 B2 | 5/2012 | Anupindi et al. | |
| 9,411,771 B2 * | 8/2016 | Huang | G06F 13/4291 |
| 2002/0167293 A1 | 11/2002 | Ptasinski et al. | |
| 2005/0091438 A1 * | 4/2005 | Chatterjee | G06F 13/409 |
| | | | 710/315 |
| 2009/0146610 A1 | 6/2009 | Trigiani | |
| 2011/0072280 A1 | 3/2011 | Chiasson et al. | |
| 2012/0166702 A1 * | 6/2012 | Toba | G06F 13/4068 |
| | | | 710/316 |
| 2013/0339714 A1 * | 12/2013 | Hormuth | G06F 15/17331 |
| | | | 713/2 |

\* cited by examiner

*Primary Examiner* — Tim T Vo
*Assistant Examiner* — Kim T. Huynh
(74) *Attorney, Agent, or Firm* — Larson Newman, LLP (57) ABSTRACT

An information handling system includes a first managed system including a first processor and a first management controller and a second managed system including a second processor and a second management controller. The first management controller is coupled to directly communicate with the second management controller. In an embodiment, the first management controller is coupled to the second management controller via a first I2C interface.

19 Claims, 5 Drawing Sheets

FIG. 7

SYSTEM MANAGEMENT THROUGH DIRECT COMMUNICATION BETWEEN SYSTEM MANAGEMENT CONTROLLERS

FIELD OF THE DISCLOSURE

This disclosure relates generally information handling systems, and more particularly relates to a system and method for system management through direct communication between management controllers.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software resources that may be configured to process, store, and communicate information and may include one or more computer systems, data storage systems, and networking systems. An information handling system can include a group of systems that are managed over a common management network. The management network can communicate with the systems via a management controller such as a baseboard management controller or the like.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
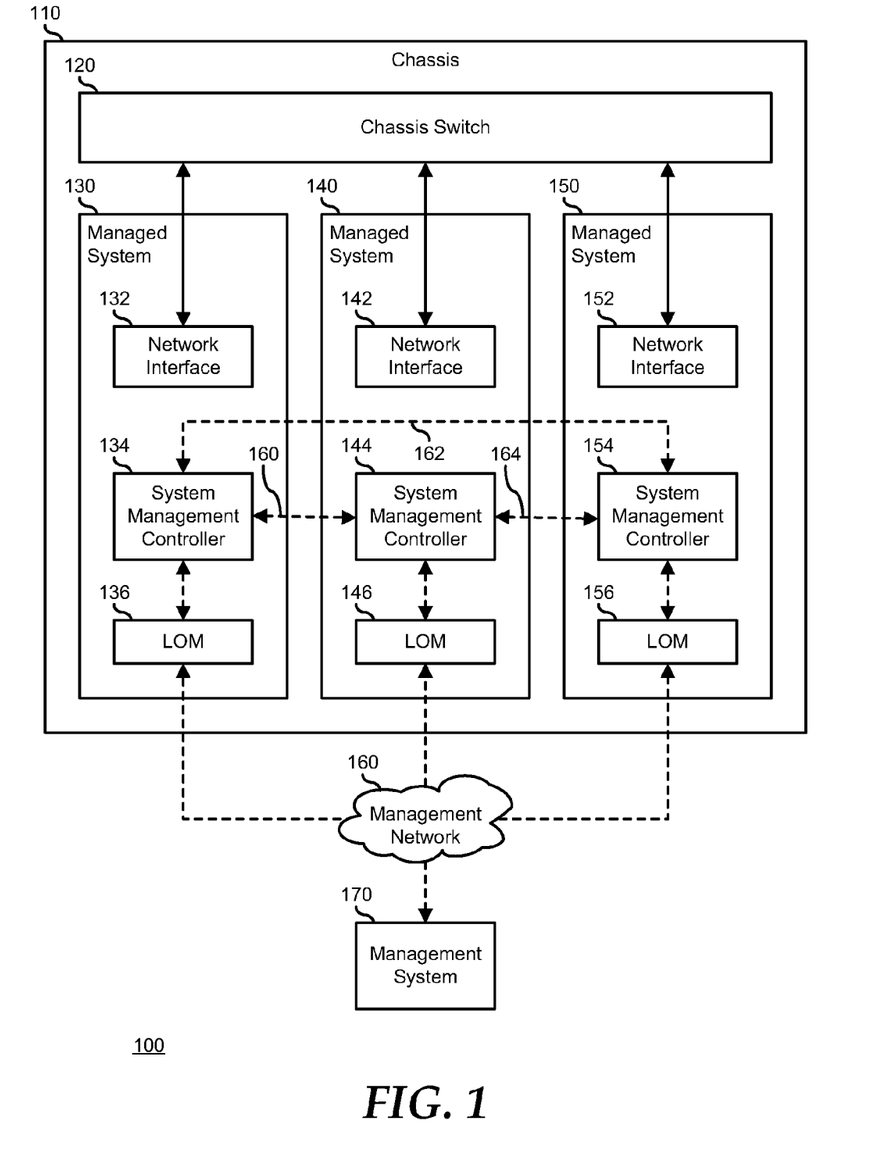
FIG. 1 is a block diagram illustrating an information handling system according to an embodiment of the present disclosure.

FIG. 1 illustrates an information handling system 100. For purpose of this disclosure, information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can include a stand-alone or rack mounted server, a blade server, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 includes a server chassis 110, a management network 160, and a management system 170. Server chassis 110 includes a chassis switch 120, and managed systems 130, 140, and 150. Server chassis 110 represents a shared infrastructure for managed systems 130, 140, and 150, such as by providing a common networking capability via chassis switch 120, shared power supplies and thermal management, and mechanical mounting for the managed systems. In particular, server chassis 110 operates to provide a backplane into which managed systems 130, 140, and 150 are plugged.

Managed system 130 includes a network interface 132, a management controller 134, and a LAN-on-motherboard (LOM) 136. Network interface 132 is connected to chassis switch 120 to provide network connectivity to managed systems 140 and 150, and to other network resources of information handling system 100. Management controller 134 operates to provide management functions for managed system 130. In a particular embodiment, the management functions include receiving sensor values, logging events, and receiving commands from management system to perform actions within managed system 130. An example of a sensor value can include a battery voltage, a temperature, a cooling fan speed, another sensor value, or a combination thereof. An example of a logged event can include a power management event, a thermal management event, another event, or a combination thereof. An example of a command from management system can include a reset or power cycle command, a battery learn cycle, another command, or a combination thereof. An example of management controller 134 includes a baseboard management controller (BMC), an Integrated Dell Remote Access Controller (iDRAC), another management controller, or a combination thereof.

In a particular embodiment, management controller 134 is connected to devices within the managed system 130, such as processors, a chipset, memory devices, a BIOS/EFI module, a graphics interface, a video display, an I/O interface, a disk controller, a network interface, or another device of the system, as needed or desired. Management controller 134 includes a system communication bus that provides an interface between the management controller and devices that are external to managed system 130. Thus, management controller 134 is connected via LOM 136 and management network 160, to management system 170 for out-of-band management of managed system 130. In a particular embodiment, management controller 134 operates on a separate power plane of managed system 130 from other devices of the managed system, such that the management controller can be operated while the other devices are powered off. In another embodiment, management controller 134 operates in a pre-operating-system operating state (e.g. during boot of managed system 130). Commands, communications, or other signals may be sent to or received from management controller 134 by management system 170. In a particular embodiment, management controller 134 is included on a main circuit board (e.g., a baseboard, a motherboard, or any combination thereof), integrated onto another component such as the chipset, or another suitable location, as needed or desired. As such, management controller 134 can be part of an integrated circuit or a chip set within managed system 130. For example management controller 134 can include a baseboard management controller (BMC), an integrated Dell remote access controller (iDRAC), another controller, or any combination thereof. In another embodiment, network interface 132 is a shared network interface such that the network traffic for both managed system 130 and for management controller 134 are handled by the network interface. Managed systems 140 and 150 are similar to managed system 130. As such, managed system 140 includes a network interface 142, a management controller 144, and a LOM 146, and managed system 150 includes a network interface 152, a management controller 154, and a LOM 156.

Management controller 134 is directly connected to management controller 144 via a communication link 160 and is directly connected to management controller 154 via a communication link 162, and management controller 144 is directly connected to management controller 154 via a communication link 164. In this way, management controllers 134, 144, and 154 provide for the communication of management information on their respective peer managed systems 130, 140, and 150, and can each perform out-of-band operations on the peer managed systems. For example, management controller 134 can direct one or more of management controllers 144 and 154 to execute battery health monitoring algorithms, system resets, diagnostic commands, power control commands, or other commands, the management controllers 144 and 154 can execute the commands locally, and can return result information to management controller 134. In a particular embodiment, communication links 160, 162, and 164 represent a common Inter-Integrated Circuit (I2C) interface where one of management controllers 134, 144, or 154 operates as an I2C bus master while the other management controllers operate as I2C bus slaves. In another embodiment, management controllers 134, 144, and 154 communicate directly with each other via management network 160, bypassing management system 170. In yet another embodiment, each of communication links 160, 162, and 164 represent a pair of I2C interfaces where each of management controllers 134, 144, and 154 operate as an I2C bus master on one of the I2C interfaces and as an I2C slave on the other I2C interfaces. Each of these embodiments will be more fully described below.

The skilled artisan will recognize that, although the inventive features described herein are illustrated in the context of information handling system 100, the particular inventive features are applicable to other architectures that provide for managed systems similar to managed systems 130, 140, and 150. For example, the inventive features described herein can be similarly applied to managed systems that are not a part of a server chassis, such as rack mounted server systems, stand alone server systems, other groups of commonly managed systems, or a combination of such architectures.

Figure 2:
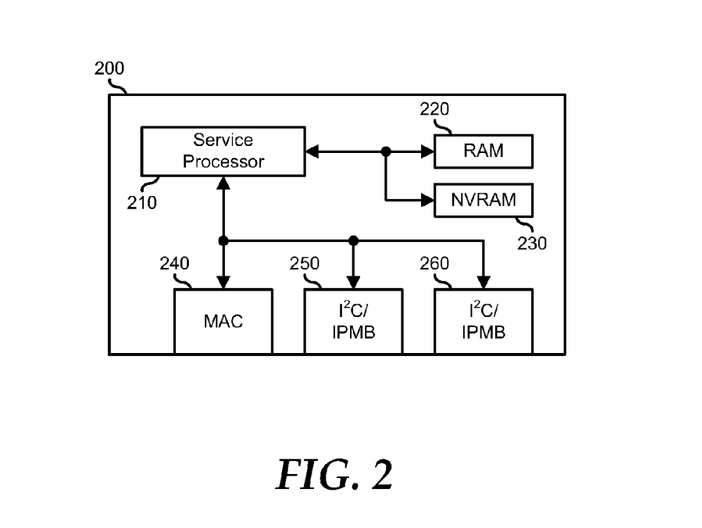
FIG. 2 is a functional block diagram illustrating a management controller in an information handling system according to an embodiment of the present disclosure.

FIG. 2 illustrates an embodiment of a management controller 200 similar to management controllers 134, 144, and 154. Management controller 200 includes a service processor 210, a random-access memory (RAM) 220, a non-volatile RAM (NVRAM) 230, a media access control (MAC) interface 240, and a pair of $I^2C$/Intelligent Platform Management Bus (IPMB) interfaces 250 and 260. Management controller 200 operates as a separate microcontroller in an information handling system, providing a dedicated management channel for maintenance and control of resources in the information handling system. In a particular embodiment, the resources in the information handling system are connected to one or more of $I^2C$/IPMB interfaces 250 and 260, permitting management controller 200 to receive information from or send information to the resources. Management controller 200 can also be connected to an external management network through MAC interface 240, permitting the management controller to receive information from or send information to an external management system similar to management system 170. In a particular embodiment, MAC interface 240 includes an Ethernet standard interface, such as a reduced media independent interface (RMII), a network communication service interface (NC-SI), another network standard interface, or a combination thereof.

Management controller 200 is implemented as one or more integrated circuit devices incorporated into a main circuit board or a separate circuit board of the information handling system. In a particular embodiment, management controller 200 operates on a separate power plane from other resources in the information handling system, enabling the management controller to communicate with the management system while other resources of the information handling system are powered off. In this way, information can be sent from the management system to management controller 200 and the information is stored in RAM 220 or NVRAM 230. In a particular embodiment, information stored in RAM 220 is lost when MC 200 is powered-down, while information stored in NVRAM 230 is saved through a power-down/power-up cycle. In a particular embodiment, NVRAM 230 includes code that is executable by service processor 210 to perform the various functions of management controller 200 as described herein. In particular, NVRAM 230 can include firmware whereby management controller 200 can directly communicate with one or more additional management controllers via one or more of MAC interface 240 or I2C/IPMB interfaces 250 and 260.

Figure 3:
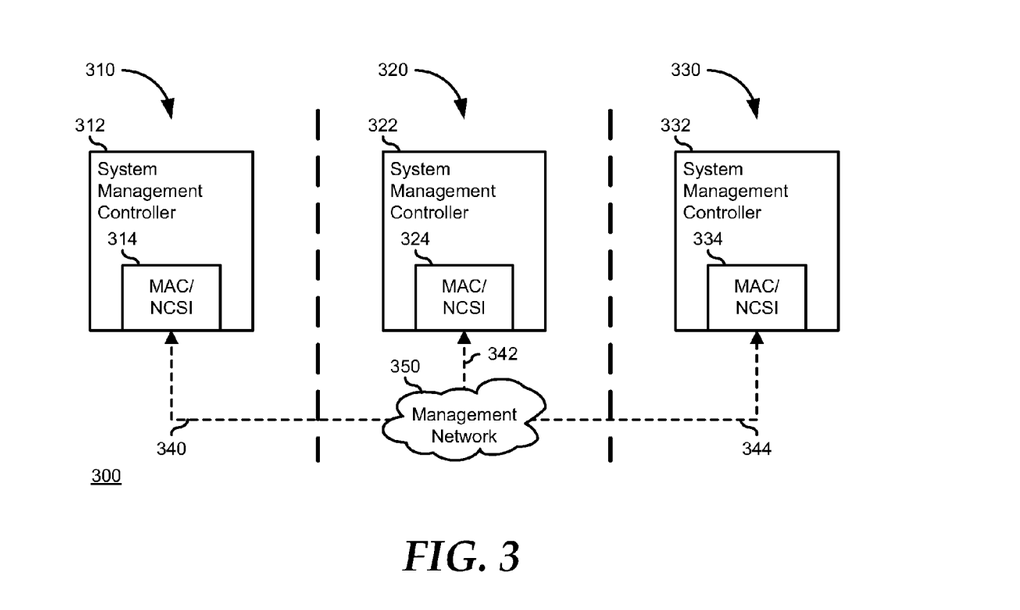
FIG. 3-5 are functional block diagrams illustrating management networks according to different embodiments of the present disclosure.

FIG. 3 illustrates an embodiment of a managed network 300 including managed systems 310, 320, and 330 and a management network 350. Managed system 310 includes a management controller 312 with a MAC interface 314, managed system 320 includes a management controller 322 with a MAC interface 324, and managed system 330 includes a management controller 332 with a MAC interface 334. MAC interface 314 is connected to management network 350 via a network connection 340, MAC interface 324 is connected to the management network via a network connection 342, and MAC interface 334 is connected to the management network via a network connection 344. In a particular embodiment, MAC interfaces 314, 324, and 334 are connected to management network 350 via dedicated LOMs associated with respective managed systems 310, 320, and 320. In another embodiment, MAC interfaces 314, 324, and 334 are connected to management network 350 using the NC-SI protocol via shared network interfaces with respective managed systems 310, 320, and 320. The presence of a management system on managed network 300 is not precluded in this embodiment, but is not shown to indicate that management controllers 312, 314, and 316 include firmware that enables the direct communication between the management controllers. In this embodiment, communication links 340, 342, and 344 represent network connections such as Ethernet cables or the like, additional hardware is not necessary to implement this embodiment, and each of management controllers 312, 322, and 332 can initiate commands to the other management controllers. However, in this embodiment, each of management controllers 312, 322, and 332 need to be provided with unique identifiers such as MAC addresses, in order to be properly identified on management network 350.

Figure 4:
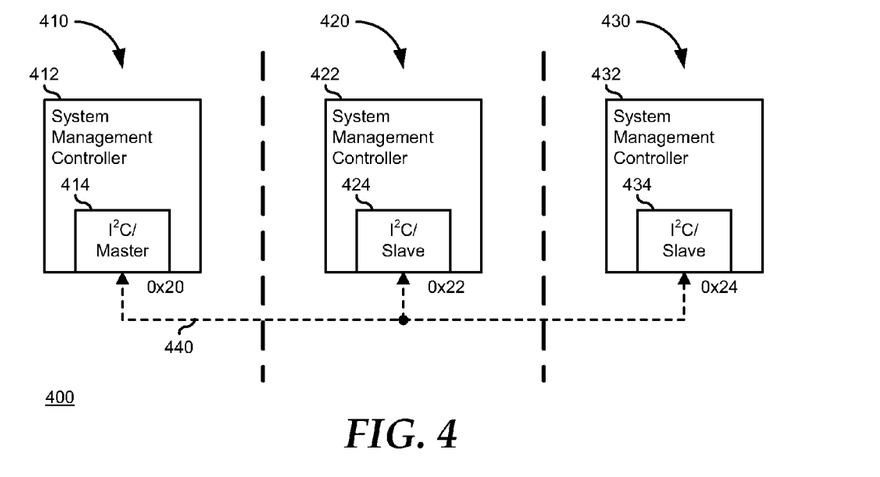

FIG. 4 illustrates an embodiment of a managed network 400 including managed systems 410, 420, and 430. Managed system 410 includes a management controller 412 with an I2C master interface 414, managed system 420 includes a management controller 422 with an I2C slave interface 424, and managed system 430 includes a management controller 432 with an I2C slave interface 434. In this embodiment, management controller 412 operates to generate a clock and to initiate communications on I2C master interface 414 that are provided on a communication link 440 to one or more of I2C slave interfaces 424 and 434. Management controllers 422 and 432 operate to receive the clock and to respond to the communications via respective I2C slave interfaces 424 and 434. In a particular embodiment, the communications represent commands that are in accordance with the Intelligent Platform Management Interface (IPMI) specification, and communication link 440 represents an IPMB interface. Here, I2C master interface 414 can be represented as having an address on the communication link 440 of 0x20, I2C slave interface 424 can be represented as having an address on the communication link 440 of 0x22, and I2C slave interface 434 can be represented as having an address on the communication link 440 of 0x24. In a particular embodiment, communication link 440 represents a hard wired connection via a backplane of a chassis similar to server chassis 110, such that, by installing a particular managed system into a designated location in the chassis, that managed system becomes associated as the managed system that includes the I2C master interface, and by installing other managed systems into other locations, the other managed systems become associated as including the I2C slave interfaces. In another embodiment, communication link 440 represents a cabled solution between managed systems 410, 420, and 430. In this embodiment, communication link 440 represents a single two-wire solution and thus enables a less complex backplane or cabled connection solution. However, in this embodiment, commands, such as to reset managed systems 410, 420, or 430 can only come from management controller 412, and cannot be initiated by either of management controllers 422 or 432.

Figure 5:
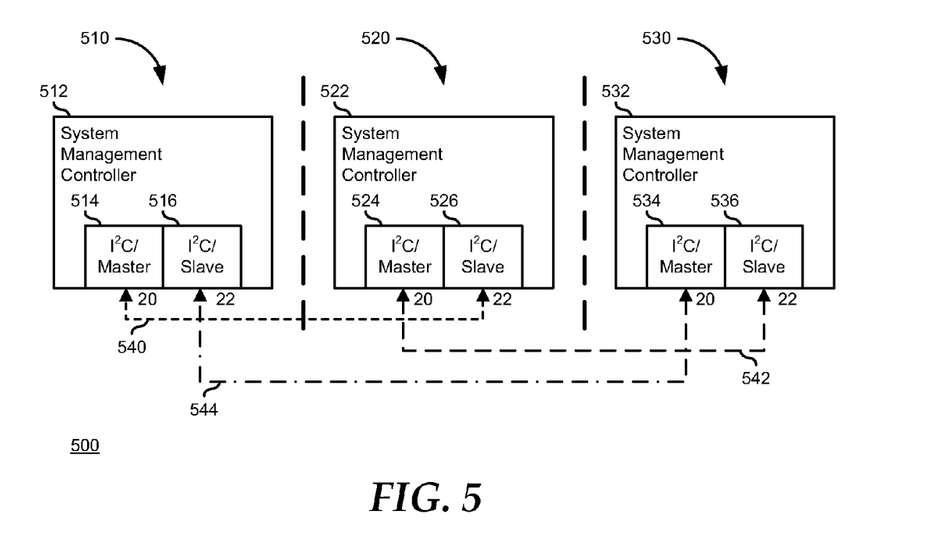

FIG. 5 illustrates an embodiment of a managed network 500 including managed systems 510, 520, and 530. Managed system 510 includes a management controller 512 with an I2C master interface 514 and an I2C slave interface 516, managed system 520 includes a management controller 522 with an I2C slave interface 524 and an I2C slave interface 526, and managed system 530 includes a management controller 532 with an I2C slave interface 534 and an I2C slave interface 536. In this embodiment, management controller 512 operates to generate a clock and to initiate communications on I2C master interface 514 that are provided on a communication link 540 to I2C slave interface 526, management controller 522 operates to generate a clock and to initiate communications on I2C master interface 524 that are provided on a communication link 542 to I2C slave interface 536, and management controller 532 operates to generate a clock and to initiate communications on I2C master interface 534 that are provided on a communication link 544 to I2C slave interface 516. As such, each of management controllers 512, 522, and 532 operate as an I2C bus master to one of the other management controllers, and as an I2C bus slave to the other one of the management controllers. In a particular embodiment, the communications represent commands that are in accordance with the IPMI specification, and communication links 540, 542, and 544 each represent IPMB interfaces.

Here, I2C master interface 514 can be represented as having an address on the communication link 540 of 0x20, and I2C slave interface 526 can be represented as having an address on the communication link 540 of 0x22. Similarly, I2C master interface 524 has an address on the communication link 542 of 0x20 and I2C slave interface 536 has an address of 0x22, and I2C master interface 534 has an address on the communication link 544 of 0x20 and I2C slave interface 516 has an address of 0x22. In a particular embodiment, communication links 540, 542, and 544 represent hard wired connections via a backplane of a chassis similar to server chassis 110. However, in this embodiment there is no need to configure any particular location to be designated as a master location. As such, firmware associated with management controllers 512, 522, and 532 are each configured to identify their respective I2C master interfaces 514, 524, and 534 as I2C bus masters and their respective I2C slave interfaces 516, 526, and 536 as I2C bus slaves, and there is no need to configure the firmware differently for each management controller. In another embodiment, communication links 540, 542, and 544 represent cabled solutions between managed systems 510, 520, and 530. In this embodiment, each of management controllers 512, 522, and 532 can initiate commands to the other management controllers.

Figure 6:
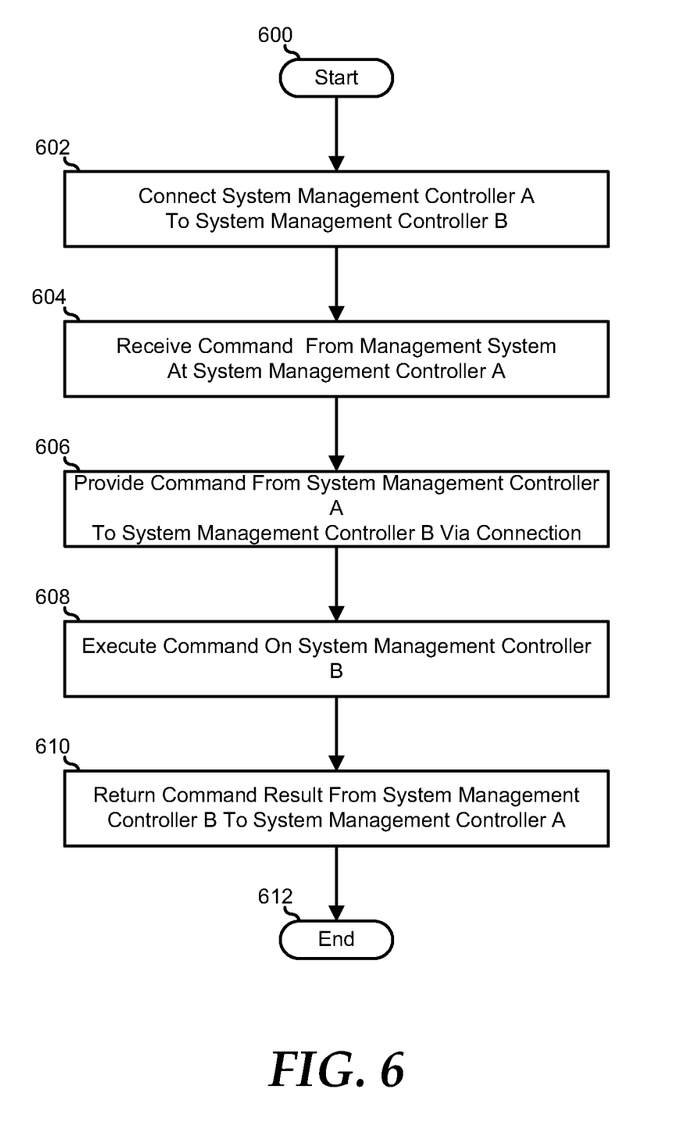
FIG. 6 is a flowchart illustrating a method for chassis management through direct communication between management controllers according to an embodiment of the present disclosure.

FIG. 6 illustrates a method for chassis management through direct communication between management controllers starting at block 600. A management controller is connected to a second management controller in block 602. For example, management controller 134 is connected to one or more of management controllers 144 and 154 to establish direct communications between the management controllers. An exemplary connection can include connecting the management controllers via a management network similar to management network 350 as depicted in FIG. 3, via a single I2C connection as depicted in FIG. 4, via a pair of I2C connections as depicted in FIG. 5, or by another interface of the management controllers. An interconnected management controller receives a command from a management system in block 604. For example, management system 170 can provide an IPMI command, such as a system reset command, a power-on command, a power-off command, a status command, or the like, to one of management controllers 134, 144, or 154. The interconnected management controller provides the command to the other interconnected management controller via the connection in block 606. For example, management controller 134 can provide the command to management controller 144. The command is executed by the second management controller in block 608. For example, management controller 144 can execute the IPMI command received from management controller 134. The second management controller returns a result from the command to the first management controller in block 610. For example, management controller 144 can provide a result of the IPMI command to management controller 134. In an embodiment, the management controller that received the result provides the result to the management station. The method then ends in block 612.

Figure 7:
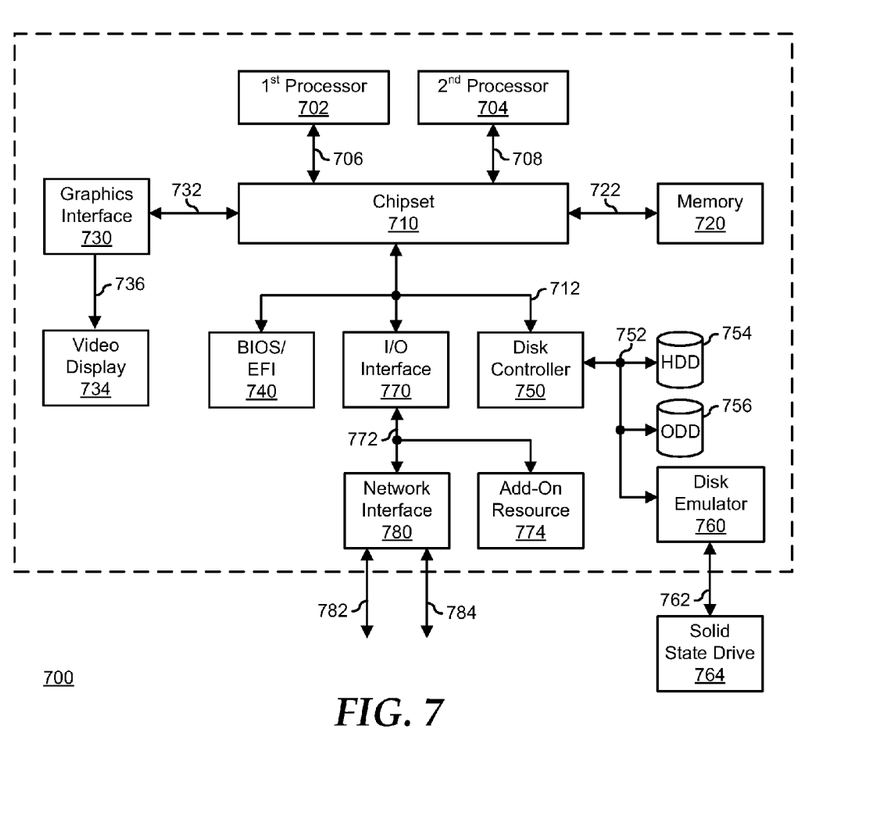
FIG. 7 is a block diagram illustrating a generalized information handling system according to an embodiment of the present disclosure.

FIG. 7 illustrates a generalized embodiment of information handling system 700. For purpose of this disclosure information handling system 700 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 700 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 700 can include processing resources for executing machine-executable code, such as a central processing unit (CPU), a programmable logic array (PLA), an embedded device such as a System-on-a-Chip (SoC), or other control logic hardware. Information handling system 700 can also include one or more computer-readable medium for storing machine-executable code, such as software or data. Additional components of information handling system 700 can include one or more storage devices that can store machine-executable code, one or more communications ports for communicating with external devices, and various input and output (I/O) devices, such as a keyboard, a mouse, and a video display. Information handling system 700 can also include one or more buses operable to transmit information between the various hardware components.

Information handling system 700 can include devices or modules that embody one or more of the devices or modules described above, and operates to perform one or more of the methods described above. Information handling system 700 includes a processors 702 and 704, a chipset 710, a memory 720, a graphics interface 730, include a basic input and output system/extensible firmware interface (BIOS/EFI) module 740, a disk controller 750, a disk emulator 760, an input/output (I/O) interface 770, and a network interface 780. Processor 702 is connected to chipset 710 via processor interface 706, and processor 704 is connected to the chipset via processor interface 708. Memory 720 is connected to chipset 710 via a memory bus 722. Graphics interface 730 is connected to chipset 710 via a graphics interface 732, and provides a video display output 736 to a video display 734. In a particular embodiment, information handling system 700 includes separate memories that are dedicated to each of processors 702 and 704 via separate memory interfaces. An example of memory 720 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 740, disk controller 750, and I/O interface 770 are connected to chipset 710 via an I/O channel 712. An example of I/O channel 712 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 710 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 740 includes BIOS/EFI code operable to detect resources within information handling system 700, to provide drivers for the resources, initialize the resources, and access the resources. BIOS/EFI module 740 includes code that operates to detect resources within information handling system 700, to provide drivers for the resources, to initialize the resources, and to access the resources.

Disk controller 750 includes a disk interface 752 that connects the disc controller to a hard disk drive (HDD) 754, to an optical disk drive (ODD) 756, and to disk emulator 760. An example of disk interface 752 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 760 permits a solid-state drive 764 to be coupled to information handling system 700 via an external interface 762. An example of external interface 762 includes a USB interface, an IEEE 1394 (Firewire) interface, a proprietary interface, or a combination thereof. Alternatively, solid-state drive 764 can be disposed within information handling system 700.

I/O interface 770 includes a peripheral interface 772 that connects the I/O interface to an add-on resource 774 and to network interface 780. Peripheral interface 772 can be the same type of interface as I/O channel 712, or can be a different type of interface. As such, I/O interface 770 extends the capacity of I/O channel 712 when peripheral interface 772 and the I/O channel are of the same type, and the I/O interface translates information from a format suitable to the I/O channel to a format suitable to the peripheral channel 772 when they are of a different type. Add-on resource 774 can include a data storage system, an additional graphics interface, a network interface card (NIC), a sound/video processing card, another add-on resource, or a combination thereof. Add-on resource 774 can be on a main circuit board, on separate circuit board or add-in card disposed within information handling system 700, a device that is external to the information handling system, or a combination thereof.

Network interface 780 represents a NIC disposed within information handling system 700, on a main circuit board of the information handling system, integrated onto another component such as chipset 710, in another suitable location, or a combination thereof. Network interface device 780 includes network channels 782 and 784 that provide interfaces to devices that are external to information handling system 700. In a particular embodiment, network channels 782 and 784 are of a different type than peripheral channel 772 and network interface 780 translates information from a format suitable to the peripheral channel to a format suitable to external devices. An example of network channels 782 and 784 includes InfiniBand channels, Fibre Channel channels, Gigabit Ethernet channels, proprietary channel architectures, or a combination thereof. Network channels 782 and 784 can be coupled to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a first managed system including a first processor and a first management controller, the first management controller including a first network interface to receive management commands from a management network, and a first inter-device interface, wherein the first processor is separate from the first management controller; and
   a second managed system including a second processor and a second management controller, the second management controller including a second network interface to receive the management commands from the management network, and a second inter-device interface connected to the first inter-device interface, wherein the second processor is separate from the second management controller, and wherein the first and second inter-device interfaces comprise an I2C interface;
   wherein the first management controller is configured to receive a first management command on the first network interface out of band from the first processor, and to provide the first management command to the second management controller on the first inter-device interface, and wherein the second management controller is configured to receive the first management command on the second inter-device interface, and to execute the first management command.

2. The information handling system of claim 1, wherein the first inter-device interface comprises an I2C master interface, and the second inter-device interface comprises an I2C slave interface.

3. The information handling system of claim 1, further comprising:
   a third managed system including a third processor and a third management controller, the third management controller including a third network interface to receive the management commands from the management network, and a third inter-device interface connected to the first inter-device interface;
   wherein the first management controller is further configured to receive a second management command on the first network interface, and to provide the second management command to the third management controller on the first inter-device interface, and wherein the third management controller is configured to receive the second management command on the third inter-device interface, and to execute the second management command.

4. The information handling system of claim 1, wherein:
   the first management controller further includes a third inter-device interface;
   the second management controller further includes a fourth inter-device interface connected to the third inter-device interface; and
   the second management controller is further configured to receive a second management command on the second network interface, and to provide the second management command to the first management controller on the fourth inter-device interface, and wherein the first management controller is configured to receive the second management command on the third inter-device interface, and to execute the second management command.

5. The information handling system of claim 1, further comprising:
   a third managed system including a third processor and a third management controller, the third management controller including a third network interface to receive the management commands from the management network, and a third inter-device interface;
   wherein the second management controller further includes a fourth inter-device interface connected to the third inter-device interface, the second management device is configured to receive a second management command on the second inter-device interface, and to provide the second management command on the fourth inter-device interface, and the third management controller is configured to receive the second management command on the third inter-device interface, and to execute the second management command.

6. The information handling system of claim 5, wherein:
   the first and fourth inter-device interfaces comprise I2C master interfaces and the second and third inter-device interfaces comprise I2C slave interfaces.

7. The information handling system of claim 1, the first management command comprises an Intelligent Platform Management Interface (IPMI) command.

8. The information handling system of claim 7, wherein the second management controller is further configured to execute the IPMI command on the second managed system.

9. The information handling system of claim 8, wherein the second management controller is further configured to provide a result from the execution of the IPMI command to the first management controller.

10. The information handling system of claim 9, wherein the first management controller is further configured to provide the result to a management system.

11. A method comprising:
coupling a first management controller of a first managed system to a second management controller of a second managed system via a first I2C interface;
coupling a first network interface of the first management controller to a management network;
coupling the second management controller to the first management controller via a second I2C interface;
coupling a second network interface of the second management controller to the management network;
receiving a first Intelligent Platform Management Interface (IPMI) command from the management network via the first network interface;
providing the IPMI command from the first management controller to the second management controller via the first I2C interface;
providing a second IPMI command from the management network via the second network interface; and
providing the second IPMI command from the second management controller to the first management controller via the second I2C interface.

12. The method of claim 11, wherein the first management controller is a first master on the first I2C interface and the second management controller is a first slave on the first I2C interface.

13. The method of claim 12, further comprising:
coupling the first management controller to a third management controller of a third managed system via the first I2C interface; and
providing the first IPMI command from the first management controller to the third management controller via the first I2C interface.

14. The method of claim 13, wherein the third management controller is a second slave on the first I2C interface.

15. The method of claim 12, further comprising:
coupling the second management controller to a third management controller of a third managed system via a third I2C interface; and
providing the first IPMI command from the second management controller to the third management controller via the second I2C interface.

16. The method of claim 15, wherein the second management controller is a second master on the third I2C interface and the third management controller is a second slave on the third I2C interface.

17. A non-transitory computer-readable medium including code for carrying out a method, the method comprising:
coupling a first management controller of a first managed system to a second management controller of a second managed system via a first I2C interface;
coupling a first network interface of the first management controller to a management network;
coupling the second management controller to the first management controller via a second I2C interface;
coupling a second network interface of the second management controller to the management network;
receiving a first Intelligent Platform Management Interface (IPMI) command from the management network via the first network interface;
providing the first IPMI command from the first management controller to the second management controller via the first I2C interface;
receiving a second IPMI command from the management network via the second network interface;
providing the second IPMI command from the second management controller to the first management controller via the second I2C interface;
wherein the first management controller is a first master on the first I2C interface and the second management controller is a first slave on the first I2C interface.

18. The computer-readable medium of claim 17, the method further comprising:
coupling the first management controller to a third management controller of a third managed system via the first I2C interface; and
providing the first IPMI command from the first management controller to the third management controller via the first I2C interface;
wherein the third management controller is a second slave on the first I2C interface.

19. The computer-readable medium of claim 17, the method further comprising:
coupling the second management controller to a third management controller of a third managed system via a third I2C interface; and
providing the first IPMI command from the second management controller to the third management controller via the second I2C interface;
wherein the second management controller is a second master on the third I2C interface and the third management controller is a second slave on the third I2C interface.

* * * * *